(12) United States Patent
Chen

(10) Patent No.: US 7,050,891 B2
(45) Date of Patent: May 23, 2006

(54) METHOD AND SYSTEM FOR GUIDING AND POSITIONING A SELF-PROPELLED VEHICLE WITH SEQUENTIAL BARCODES

(75) Inventor: You-Shih Chen, Dounan Township, Yunlin County (TW)

(73) Assignee: Institute for Information Industry, (TW)

( * ) Notice: Subject to any disclaimer, the term of this patent is extended or adjusted under 35 U.S.C. 154(b) by 0 days.

(21) Appl. No.: 10/866,775

(22) Filed: Jun. 15, 2004

(65) Prior Publication Data

US 2005/0222722 A1  Oct. 6, 2005

(51) Int. Cl.
*B62D 1/00* (2006.01)
*G05D 1/00* (2006.01)

(52) U.S. Cl. .................. 701/23; 701/26; 180/169
(58) Field of Classification Search .................. 701/23, 701/26, 69, 210; 180/167, 168, 169; 318/567, 318/568.12, 587, 580
See application file for complete search history.

(56) References Cited

U.S. PATENT DOCUMENTS

| | | | | |
|---|---|---|---|---|
| 4,003,445 A | * | 1/1977 | De Bruine | 180/168 |
| 4,566,032 A | * | 1/1986 | Hirooka et al. | 348/119 |
| 4,790,402 A | * | 12/1988 | Field et al. | 180/169 |
| 4,990,841 A | * | 2/1991 | Elder | 318/587 |
| 5,202,742 A | * | 4/1993 | Frank et al. | 356/5.1 |
| 6,256,560 B1 | * | 7/2001 | Kim et al. | 701/23 |
| 6,498,454 B1 | * | 12/2002 | Pinlam et al. | 320/107 |

* cited by examiner

Primary Examiner—Dalena Tran
(74) Attorney, Agent, or Firm—Bacon & Thomas PLLC

(57) ABSTRACT

A method and system for guiding and positioning a self-propelled vehicle with sequential barcodes has a self-propelled vehicle capable of moving on the strip holder according to the recorded barcode serial numbers on the strip holder. Furthermore, due to the barcode serial number is sequential and the gaps between the barcodes are the same, the self-propelled vehicle can calculate its velocity, distance of travel and a distance to a target location according to the barcode serial numbers. Moreover, the self-propelled vehicle can select different important positioning points.

12 Claims, 3 Drawing Sheets

METHOD AND SYSTEM FOR GUIDING AND POSITIONING A SELF-PROPELLED VEHICLE WITH SEQUENTIAL BARCODES

BACKGROUND OF THE INVENTION

1. Field of the Invention

The present invention relates to a method and system for guiding and positioning a self-propelled vehicle and, more particularly, to a method and system of guiding and positioning a self-propelled vehicle with sequential barcodes.

2. Description of the Related Art

Automation and computerization are some of the most popular trends in industry today; as a consequence, self-propelled vehicles are also becoming more important. From factory transportation to house cleaning, self-propelled vehicles can be utilized in a variety of environments. In order to enable a self-propelled vehicle to move in an open space, a reliable and intelligent guidance system is necessary.

In a prior art technique, image recognition and distance sensing techniques are combined with a predetermined map, and indoor positioning techniques, to plan a route to a destination. However, this technique requires many expensive sensors, and complex software algorithms, which leads to a high-cost guidance system. In addition, this technique also requires an environment having little variety and a low number of obstructions.

As shown in FIG. 1, a prior art technique utilizes an illuminating strip for path tracking, and a customized coding system without sequential setting. This technique requires a specific coding sensor 11 and a separation mark 110 at every positioning point. Therefore, it is desirable to provide a guidance system that mitigates and/or obviate the aforementioned problems.

SUMMARY OF THE INVENTION

A main objective of the present invention is to provide a method and system for guiding and positioning a self-propelled vehicle with sequential barcodes, which can guide and position the self-propelled vehicle, while providing flexibility for important positioning points.

Another objective of the present is to provide a method and system for guiding and positioning a self-propelled vehicle with sequential barcodes that can be recognized by a typical barcode scanner.

According to one aspect of the present invention, the method for guiding and positioning a self-propelled vehicle with sequential barcodes comprises: (A) planning a route for the self-propelled vehicle and arranging a strip holder on the route; (B) placing barcodes on the strip holder; wherein every barcode presents a serial number and the barcodes placed on continuous straight sections of strip holder without branches are numbered continuously; (C) enabling a self-propelled vehicle to move on the strip holder, read the barcodes placed on the strip holder, and record the barcode serial numbers; and (D) enabling the self-propelled vehicle to move on the strip holder, read a barcode placed on the strip holder at a current position, and controlling the self-propelled vehicle according to the recorded barcode serial numbers.

According to another aspect of the present invention, a system for guiding and positioning a self-propelled vehicle with sequential barcodes comprises: a strip holder with sequential barcodes and a least one self-propelled vehicle, wherein each barcode has a serial number and the barcodes placed on continuous straight sections of strip holder without branches are continuously numbered; and at least one self-propelled vehicle capable of moving on the strip holder, the self-propelled vehicle further comprises: a barcode reading device for reading the barcodes placed on the strip holder; and a self-guiding device for controlling movement of the self-propelled vehicle according to a barcode read by the barcode reading device.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
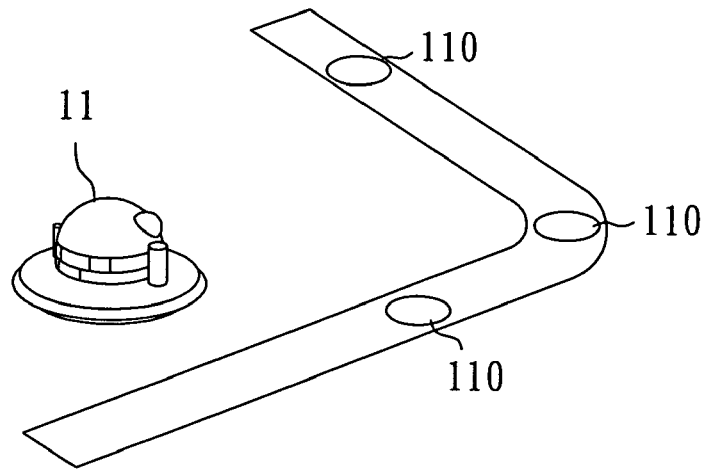
FIG. 1 is a schematic drawing for planning a route according to the prior art.
Figure 2:
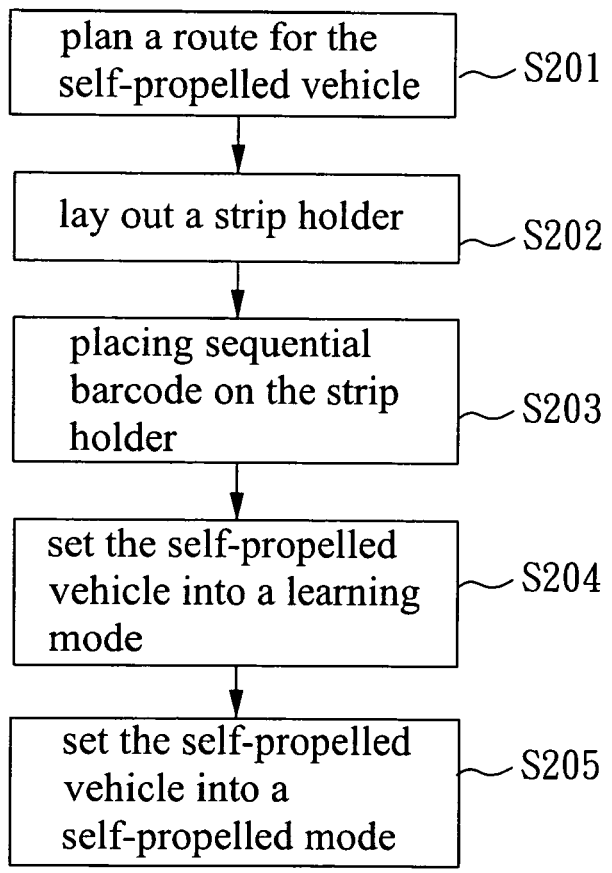
FIG. 2 is an operational flow chart of an embodiment according to the present invention.
Figure 3:
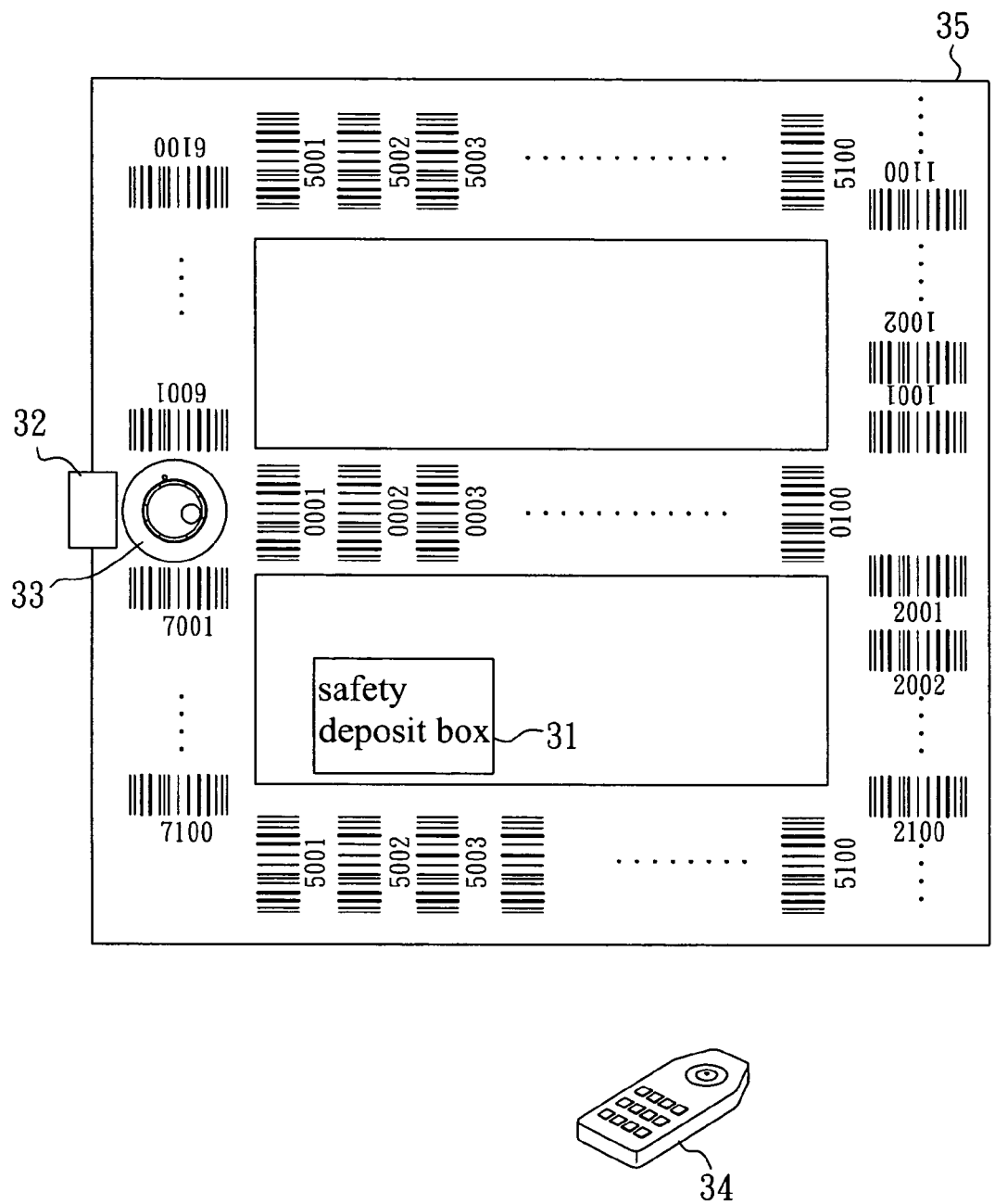
FIG. 3 is a schematic drawing of the embodiment according to the present invention.

Please refer to FIG. 2 and FIG. 3. FIG. 2 is an operational flow chart of an embodiment according to the present invention. FIG. 3 is an environment schematic drawing of the embodiment according to the present invention. In this embodiment, a self-propelled vehicle 33 is used as a security system. First, in step 201, when a user wants to set up a security system in a room, he or she needs to plan a route for the self-propelled vehicle 33 based upon the layout of the room. After determining the route, the user takes a vehicle recharging point 32 as a starting point to lay out a strip holder with sequential barcode on the route (step 202). In this embodiment, the strip holder is a reflecting strip 35.

Figure 4:
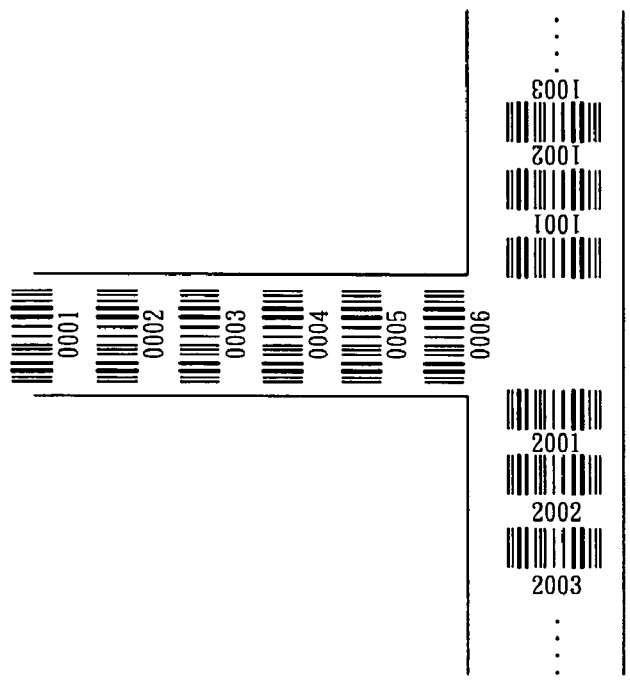
FIG. 4 is a schematic drawing of arranging sequential barcode according to the present invention.

In step 203, after the reflecting strip 35 is laid out, a plurality of sequential barcodes are placed on the reflecting strip 35. Each barcode provides a serial number, and barcodes placed on a continuous run of straight track, without branches, are continuously numbered. On the other hand, barcode serial numbers placed at a discontinuous section of track are discontinuously numbered, as shown in FIG. 4.

Figure 5:
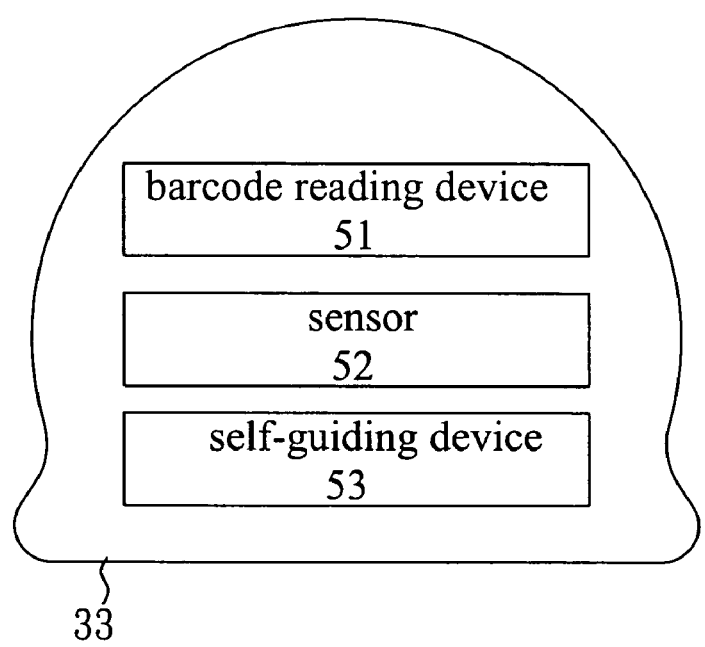
FIG. 5 is a functional block diagram of a self-propelled vehicle according to the present invention.

In step 204, when the reflecting strip 35 and the sequential barcodes are all arranged, the user places the self-propelled vehicle 33 into a learning mode to track the sequential barcodes and record those barcodes located at discontinuous sections. Please refer to FIG. 5. FIG. 5 is a functional block diagram of a self-propelled vehicle of an embodiment according to the present invention. The self-propelled vehicle comprises a barcode reading device 51, a sensor 52 and a self-guiding device 53. The barcode reading device 51 is used to read the barcodes placed upon the reflecting strip 35; the sensor 52 is used for sensing external conditions around the self-propelled vehicle to provide an alarm functionality. The self-guiding device 53 is used for controlling movement of the self-propelled vehicle 33 according to the barcodes read by the barcode reading device 51. When the self-propelled vehicle 33 is placed on the reflecting strip 35 for the first time, the barcode reading device 51 reads and records the barcode serial numbers at a beginning point, and when the self-propelled vehicle 33 moves along the reflecting strip 35, the barcode reading device 51 reads and records the barcode serial numbers as they pass by. Since the barcode serial numbers are sequentially arranged, by reading the barcode serial numbers the self-guiding device 53 can determine the current position of the self-propelled vehicle 33, the velocity of the self-propelled vehicle 33, and whether the self-propelled vehicle 33 is moving forward (for example, in a direction of increasing barcode serial numbers) or backwards (in a direction of decreasing barcode serial numbers).

The self-propelled vehicle 33 goes back to the beginning point to finish its route, and a vehicle recharging point 32 is mounted at the beginning point. Consequently, when the self-propelled vehicle 33 is low on power, it can automatically move back to the beginning point to recharge.

Gaps between the barcodes, and a placement height of the barcode serial numbers are determined based upon a sensing time of the barcode reading device 51 and a velocity of the self-propelled vehicle 33. However, in this embodiment, the sensing time of the barcode reading device 51 and the velocity of the self-propelled vehicle 33 are not an issue under discussion; rather, the gaps between the barcodes should all be the same. Since all the gaps are identical, the self-propelled vehicle 33 can calculate its velocity, distance of travel and a distance to a target location according to the barcode serial numbers. The self-propelled vehicle calculates its velocity by: $V=\Delta D/\Delta D /\Delta T$, according to the recorded barcode serial numbers, wherein $\Delta T=T2-T1$, $\Delta D=G\times(B2-B1)$, B1 and B2 are barcode serial numbers respectively recorded at time T1 and T2, and G is the gap between two continuous barcode serial numbers. If the barcode serial number at the target goal is B3, the distance to the target goal is $G\times(B3-B2)$.

After the self-propelled vehicle 33 has searched the entire route, the user can set the self-propelled vehicle 33 into a self-propelled mode (step 205) and set the self-propelled vehicle 33 time to return to the power charging point 32 for recharging. The self-propelled vehicle 33 moves along the reflecting strip 35, reading the barcodes on the current reflector strip 35 at its current position, and is thereby controlled according to the recorded barcode serial numbers. In this embodiment, a remote control device 34 can augment the operation of the self-propelled vehicle 33; when the self-propelled vehicle 33 is self-guiding, the user can use the remote control unit 34 to cause the self-propelled vehicle 33 to stop at a plurality of important points. As shown in FIG. 3, when the self-propelled vehicle 33 moves to a safety deposit box 31 for the first time, the remote control device 34 can recode the barcode serial number at the safety deposit box 31, and then the self-propelled vehicle 33 will stop at the recorded barcode serial number next time.

Although the present invention has been explained in relation to its preferred embodiment, it is to be understood that many other possible modifications and variations can be made without departing from the spirit and scope of the invention as hereinafter claimed.

What is claimed is:

1. A method for guiding and positioning a self-propelled vehicle with sequential barcode, comprising:
   (A) planning a route for the self-propelled vehicle and arranging a strip holder on the route;
   (B) placing barcodes on the strip holder; wherein every barcode presents a serial number and the barcodes placed on continuous straight strip holder sections without branches are numbered continuously;
   (C) enabling a self-propelled vehicle to move on the strip holder, read the barcodes placed on the strip holder, and record the barcode serial numbers; and
   (D) enabling the self-propelled vehicle to move on the strip holder, read a barcode placed on the strip holder at a current position, and controlling the self-propelled vehicle according to the recorded barcode serial numbers, wherein the self-propelled vehicle calculates a travel distance by calculating $G\times(B2-B1)$, according to the recorded barcode serial numbers, where B1 is a previously passed barcode serial number, B2 is a current barcode serial number, and G is a gap between two continuous barcode serial numbers.

2. The method as claimed in claim 1, wherein in step (D), the self-propelled vehicle obtains a current position by reading the barcode serial number.

3. The method as claimed in claim 2, wherein step (A) further comprises planning a plurality of important points on the route, and upon reading the barcode serial numbers at the important points the self-propelled vehicle enhances its duty.

4. The method as claimed in claim 1, wherein in step (B), the barcode serial numbers placed on discontinuous sections of strip holder are discontinuously numbered.

5. A method for guiding and positioning a self-propelled vehicle with sequential barcode, comprising:
   (A) planning a route for the self-propelled vehicle and arranging a strip holder on the route;
   (B) placing barcodes on the strip holder; wherein every barcode presents a serial number and the barcodes placed on continuous straight strip holder sections without branches are numbered continuously;
   (C) enabling a self-propelled vehicle to move on the strip holder, read the barcodes placed on the strip holder, and record the barcode serial numbers; and
   (D) enabling the self-propelled vehicle to move on the strip holder, read a barcode placed on the strip holder at a current position, and controlling the self-propelled vehicle according to the recorded barcode serial numbers, where the self-propelled vehicle predicts a distance to a target position by: $G\times(B3-B2)$, according to the recorded barcode serial numbers, wherein B2 is a current barcode serial number, B3 is a barcode serial number of the target position, and G is a gap between two continuous barcode serial numbers.

6. The method as claimed in claim 5, wherein in step (D), the self-propelled vehicle obtains a current position by reading the barcode serial numbers.

7. The method as claimed in claim 6, wherein step (A) further comprises planning a plurality of important points on the route, and upon reading the barcode serial numbers at the important points the self-propelled vehicle enhances its duty.

8. The method as claimed in claim 5, wherein in step (B), the barcode serial numbers placed on discontinuous sections of strip holder are discontinuously numbered.

9. A method for guiding and positioning a self-propelled vehicle with sequential barcode, comprising:
   (A) planning a route for the self-propelled vehicle and arranging a strip holder on the route;
   (B) placing barcodes on the strip holder; wherein every barcode presents a serial number and the barcodes placed on continuous straight strip holder sections without branches are numbered continuously;

(C) enabling a self-propelled vehicle to move on the strip holder, read the barcodes placed on the strip holder, and record the barcode serial numbers; and (D) enabling the self-propelled vehicle to move on the strip holder, read a barcode placed on the strip holder at a current position, and controlling the self-propelled vehicle according to the recorded barcode serial numbers, where the self-propelled vehicle calculates a velocity by calculating $V=\Delta D/\Delta T$, according to the recorded barcode serial numbers, wherein $\Delta T=T2-T1$, $\Delta D=G\times(B2-B1)$, B1 and B2 are barcode serial numbers respectively recorded at times T1 and T2, and G is a gap between two continuous barcode serial numbers.

10. The method as claimed in claim 9, wherein in step (D), the self-propelled vehicle obtains a current position by reading the barcode serial numbers.

11. The method as claimed in claim 10, wherein step (A) further comprises planning a plurality of important points on the route, and upon reading the barcode serial numbers at the important points the self-propelled vehicle enhances its duty.

12. The method as claimed in claim 9, wherein in step (B), the barcode serial numbers placed on discontinuous sections of strip holder are discontinuously numbered.

* * * * *